United States Patent
Zhou et al.

(10) Patent No.: US 8,021,967 B2
(45) Date of Patent: Sep. 20, 2011

(54) NANOSCALE WICKING METHODS AND DEVICES

(75) Inventors: Jijie Zhou, Pasadena, CA (US); Michael Bronikowski, Tujunga, CA (US); Flavio Noca, Pampigny (CH); Elijah B. Sansom, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 278 days.

(21) Appl. No.: 11/264,759

(22) Filed: Oct. 31, 2005

(65) Prior Publication Data

US 2007/0099311 A1    May 3, 2007

Related U.S. Application Data

(60) Provisional application No. 60/624,113, filed on Nov. 1, 2004.

(51) Int. Cl.
*H01L 21/20* (2006.01)
*H01L 21/36* (2006.01)

(52) U.S. Cl. ... 438/492; 438/99; 438/761; 257/E21.049; 257/E51.04

(58) Field of Classification Search ............... 438/487, 438/492, 493, 500, 502, 584, 758, 800, 962, 438/99, FOR. 135, 91, 761; 257/E51.04, 257/E21.09, E21.041, E21.049; 977/738, 977/742, 842, 743; 204/450
See application file for complete search history.

(56) References Cited

U.S. PATENT DOCUMENTS

| | | | |
|---|---|---|---|
| 3,955,015 A | 5/1976 | Ohtsuka et al. | 427/163.2 |
| 4,104,204 A | 8/1978 | Williams | 531/32 |
| 4,173,474 A | 11/1979 | Tanaka et al. | 430/1 |
| 4,173,475 A | 11/1979 | Chandross et al. | 430/290 |
| 4,260,725 A | 4/1981 | Keogh et al. | 526/279 |
| 4,330,383 A | 5/1982 | Ellis et al. | 526/279 |
| 4,575,373 A | 3/1986 | Johnson | 623/6.22 |
| 4,617,350 A | 10/1986 | Maeda et al. | 525/153 |
| 4,685,921 A | 8/1987 | Peyman | 623/6.13 |
| 4,787,903 A | 11/1988 | Grendahl | 623/6.37 |
| 4,790,847 A | 12/1988 | Woods | 417/413.3 |
| 4,816,031 A | 3/1989 | Pfoff | 606/4 |
| 4,846,172 A | 7/1989 | Berlin | 606/4 |
| 4,921,589 A | 5/1990 | Yates et al. | 204/157.5 |
| 4,942,112 A | 7/1990 | Monroe et al. | 430/282.1 |

(Continued)

FOREIGN PATENT DOCUMENTS

EP     0472384 A2    2/1992

(Continued)

OTHER PUBLICATIONS

Avrutsky, et al., "Multiwavelength Diffraction and Apodization using Binary superimposed Gratings", IEEE Photonics Technology Letters, vol. 10, pp. 839-841 (Jun. 1998).

(Continued)

*Primary Examiner* — Matthew Smith
*Assistant Examiner* — Quovaunda Jefferson
(74) *Attorney, Agent, or Firm* — Ladas & Parry, LLP

(57) ABSTRACT

A fluid transport method and fluid transport device are disclosed. Nanoscale fibers disposed in a patterned configuration allow transport of a fluid in absence of an external power source. The device may include two or more fluid transport components having different fluid transport efficiencies. The components may be separated by additional fluid transport components, to control fluid flow.

37 Claims, 7 Drawing Sheets

U.S. PATENT DOCUMENTS

| | | | | |
|---|---|---|---|---|
| 5,066,301 | A | 11/1991 | Wiley | 623/6.13 |
| 5,110,339 | A | 5/1992 | Ciriello et al. | 65/238 |
| 5,141,678 | A | 8/1992 | Blum | 264/1.7 |
| 5,173,381 | A | 12/1992 | Natansohn et al. | 430/19 |
| 5,213,825 | A | 5/1993 | Shimizu et al. | 425/595 |
| 5,258,024 | A | 11/1993 | Chavel et al. | 623/5.16 |
| 5,288,293 | A | 2/1994 | O'Donnell | 623/6.22 |
| 5,296,305 | A | 3/1994 | Baude et al. | 428/520 |
| 5,443,506 | A | 8/1995 | Garabet | 623/6.13 |
| 5,443,955 | A | 8/1995 | Cornell et al. | 435/7.21 |
| 5,470,662 | A | 11/1995 | Weber et al. | 428/421 |
| 5,480,428 | A | 1/1996 | Fedorov et al. | 623/6.14 |
| 5,529,861 | A | 6/1996 | Redfield | 430/1 |
| 5,549,668 | A | 8/1996 | O'Donnell, Jr. | 623/6.22 |
| 5,617,020 | A | 4/1997 | Campbell et al. | 324/142 |
| 5,623,002 | A | 4/1997 | Nomura et al. | 523/106 |
| 5,684,636 | A | 11/1997 | Chow et al. | 359/665 |
| 5,702,846 | A | 12/1997 | Sato et al. | 430/6.2 |
| 5,725,575 | A | 3/1998 | O'Donnell, Jr. | 623/6.56 |
| 5,728,155 | A | 3/1998 | Anello et al. | 623/6.47 |
| 5,728,156 | A | 3/1998 | Gupta et al. | 623/6.26 |
| 5,744,267 | A | 4/1998 | Meerholz et al. | 430/1 |
| 5,762,836 | A | 6/1998 | Bos et al. | 264/1.7 |
| 5,807,906 | A | 9/1998 | Bonvallot et al. | 522/182 |
| 5,837,115 | A | 11/1998 | Austin et al. | 204/450 |
| 5,858,585 | A | 1/1999 | Haarer et al. | 430/1 |
| 5,892,601 | A | 4/1999 | Curtis et al. | 359/22 |
| 5,920,536 | A | 7/1999 | Campbell et al. | 369/103 |
| 5,943,145 | A | 8/1999 | Curtis et al. | 359/22 |
| 5,948,470 | A | 9/1999 | Harrison et al. | 427/198 |
| 5,964,802 | A | 10/1999 | Anello et al. | 623/6.4 |
| 5,981,962 | A | 11/1999 | Groves et al. | 623/6.46 |
| 5,995,251 | A | 11/1999 | Hesselink et al. | 359/30 |
| 5,998,096 | A | 12/1999 | Umemoto et al. | 430/281.1 |
| 6,027,623 | A | 2/2000 | Ohkawa | 204/450 |
| 6,046,290 | A | 4/2000 | Berneth et al. | 526/263 |
| 6,146,227 | A | 11/2000 | Mancevski | 445/24 |
| 6,154,432 | A | 11/2000 | Faruqi et al. | 369/103 |
| 6,228,248 | B1 * | 5/2001 | Aksay et al. | 205/687 |
| 6,232,706 | B1 | 5/2001 | Dai et al. | 313/309 |
| 6,271,281 | B1 | 8/2001 | Liao et al. | 523/106 |
| 6,278,231 | B1 | 8/2001 | Iwasaki et al. | 313/310 |
| 6,346,189 | B1 | 2/2002 | Dai et al. | 205/766 |
| 6,361,861 | B2 | 3/2002 | Gao et al. | 428/367 |
| 6,368,871 | B1 * | 4/2002 | Christel et al. | 436/180 |
| 6,399,406 | B2 | 6/2002 | Chan et al. | 438/28 |
| 6,401,526 | B1 | 6/2002 | Dai et al. | 73/105 |
| 6,440,761 | B1 | 8/2002 | Choi | 438/20 |
| 6,685,810 | B2 | 2/2004 | Noca et al. | 204/450 |
| 6,685,841 | B2 * | 2/2004 | Lopez et al. | 210/767 |
| 6,766,817 | B2 | 7/2004 | da Silva | 137/1 |
| 7,157,990 | B1 * | 1/2007 | Adam et al. | 333/186 |
| 7,211,320 | B1 * | 5/2007 | Cooper et | 428/306.6 |
| 2002/0172963 | A1 * | 11/2002 | Kelley et al. | 435/6 |
| 2003/0052006 | A1 * | 3/2003 | Noca et al. | 204/450 |
| 2003/0119034 | A1 * | 6/2003 | Kang et al. | 435/6 |
| 2006/0073089 | A1 * | 4/2006 | Ajayan et al. | 423/447.2 |
| 2009/0159243 | A1 * | 6/2009 | Zhao et al. | 165/104.26 |

FOREIGN PATENT DOCUMENTS

| | | |
|---|---|---|
| EP | 0689067 A2 | 12/1995 |
| JP | 60175009 | 9/1985 |
| JP | 01120740 | 5/1989 |
| JP | 05-096553 | 4/1993 |
| JP | 07-185327 * | 7/1995 |
| JP | 07281426 | 10/1995 |
| JP | 0810503 | 4/1996 |
| JP | 08101499 | 4/1996 |
| JP | 08101502 | 4/1996 |
| WO | 93/21245 A1 | 10/1993 |
| WO | 95/17460 A1 | 6/1995 |
| WO | 98/05272 A1 | 2/1998 |
| WO | 98/27863 A1 | 7/1998 |
| WO | 99/26112 A1 | 5/1999 |
| WO | 00/41650 A1 | 7/2000 |
| WO | 01/21061 A1 | 3/2001 |
| WO | 01/71411 A2 | 9/2001 |
| WO | 01/86647 A2 | 11/2001 |
| WO | 02/093738 A2 | 11/2002 |

OTHER PUBLICATIONS

Baughman, et al., "Carbon Nanotube Actuators", Science, vol. 284, pp. 1340-1344 (May 21,1999).

Boul, et al., "Reversible Sidewall Functionalization of Buckytubes", Chemical Physics Letters, vol. 310, pp. 367-372 (Sep. 3, 1999).

Chakrapani, et al., "Capillarity-Driven Assembly of Two-Dimensional Cellular Carbon Nanotube Foams", vol. 101, No. 12, pp. 4009-4012.

Chen, et al., "Plasma-Induced Low Temperature Growth of Graphitic Nanofibers on Nickel Substrates", Journal of Crystal Growth, vol. 193, pp. 342-346 (1998).

Choi, et al., "Growth of Carbon Nanotubes by Microwave Plasma-Enhanced Chemical Vapor Deposition At Low Temperature", J. Vac. Sci Techno., vol. 18, No. 4, pp. 1864-1868 (Jul./Aug. 2000).

Chou, et al., "A Microfabricated Device for Sizing and Sorting DNA Molecules", Proc. Natl. Acad. Sci. USA, vol. 96, pp. 11-13 (Jan. 1999).

Correa-Duarte, et al., "Fabrication and Biocompatibility of Carbon Nanotube-Based 3-D Networks as Scaffolds for Cell Seeing and Growth", Nano Letters, vol. 4, No. 11, pp. 2233-2236 (2004).

Dial, et al., "Fabrication of High Density Nanostructures by the Electron Beam Lithography", J. Vac. Sci Technol. B., vol. 16, No. 6, pp. 3887-3890 (Nov./Dec. 1998).

Drmanac, et al., "Sequencing by Hybridization", Chapter 4 from Automated DNA Sequencing and Analysis, Academic Press, pp. 29-36 (1994).

Duke, et al., "Pulsed-Field Electrophoresis in Microlithographic Arrays", Electrophoresis, vol. 17, pp. 1075-1079 (1996).

Duke, et al., "Sequencing in Nanofabricated Arrays: A Feasibility Study", Electrophoresis, vol. 18, pp. 17-22 (1997).

Fan, et al., "Self-Oriented Regular Arrays of Carbon Nanotubes and Their Field Emission Properties", Science, vol. 283, pp. 512-514 (1999).

Hadd, et al., "Sub-Microliter DNA Sequencing for Capillary Array Electrophoresis", Journal of Chromatography A, vol. 894, pp. 191-201 (2000).

Hafner, et al., "Direct Growth of Single-Walled Carbon Nanotube Scanning Probe Microscopy Tips", J. Am. Chemical Soc., vol. 121, pp. 9750-9751 (1999).

Hafner, et al., "Catalytic Growth of Single-Wall Carbon Nanotubes From Metal Particles", vol. 296, pp. 195-202 (Oct. 30, 1998).

Han, et al., "Entropic Trapping and Escape of Long DNA Molecules at Submicron Size Construction", Physical Review Letters, vol. 83, No. 8, pp. 1688-1691 (Jun. 15, 1998).

Han, et al., "Observation and Modeling of Single-Wall Carbon Nanotube Bend Junctions", Physical Review B, vol. 57, No. 23, pp. 983-989 (1998).

Han, et al., "Synthesis of Carbon Nanotube Bridges on Patterned Silicon Wafers by Selective Lateral Growth", Journal of Applied Physics, vol. 90, No. 11, pp. 5731-5734 (Dec. 1, 2001).

Harrison, et al., "Lithography with a Mask of block Copolymer Microstructures", J. Vac. Sci. Technol. B., vol. 16, No. 2, pp. 544-552 (Mar./Apr. 1998).

Hoppe, et al., "Arrays of Carbon Nanotubes as RF Filters in Waveguides", retrieved from http://www.nasatech.com/Briefs/Apr03/NP030207.html, on May 9, 2003, 2 pp.

Li et al., "Highly Ordered Carbon Nanotube Arrays for Electronics Applications", Applied Physics Letters, vol. 75, No. 3, pp. 367-369 (Jul. 19,1999).

Huang, et al ."Growth of Highly Oriented Carbon Nanotubes by Plasma-Enhanced hot filament Chemical Vapor Deposition", Applied Physics Letters, vol. 73, No. 26, pp. 3845-3847 (Dec. 28, 1998).

Hutt, et al., "Microfabricated Capillary Eletrophoresis Amino Acid Chirality Analyzer for Extraterrestrial Exploration", Analytical Chemistry, vol. 71, No. 18, pp. 4000-4006 (Sep. 15, 1999).

Ilic et al., "Mechanical Resonant Immunospecific Biological Detector", Applied Physics Letters, vol. 77, No. 3, pp. 450-452 (Jul. 17, 2000).

Ju, et al., "Energy Transfer Primers: A New Fluorescence Labeling Pradigm for DNA Sequencing and Analysis", Nature Medicine, vol. 2, No. 2, pp. 246-249 (Feb. 1996).

Kelly, "Unidirectional Rotary Motion in a Molecular System", Nature, vol. 401, pp. 150-152 (Sep. 9, 1999).

Kim, et al., "Nanotube Nanotweezers", Science, vol. 286, pp. 2148-2150 (Dec. 10, 1999).

Korgel, et al., "Self-Assembly of Silver NanoCrystals into Two-Dimensional Nanowire Arrays", Advanced Materials, vol. 10, No. 9, pp. 661-665 (1998).

Koumura, et al., "Light Driven Monodirectional Molecular Rotor", Nature, vol. 401, pp. 152-155 (Sep. 9, 1999).

Lee, et al., "Low Temperature Growth of Carbon Nanotubes by Thermal Chemical Vapor Deposition Using Pd, Cr, and Pt as Co-Catalyst", Chemical Physics Letters, vol. 79, No. 11, pp. 1670-1672 (Sep. 10, 2001).

Li, et al., "Carbon Nanotube Films Prepared by Thermal Chemical Vapor Deposition at Low Temperature for Field Emission Applications", Applied Physics Letters, vol. 79, No. 11, pp. 1670-1672 (Sep. 10, 2001).

Masuda, et al., "Highly Ordered Nanochannel-array Achitecture in Anodic Alumina", Applied Phsyics Letters, vol. 71, No. 19, pp. 2770-2772 (Jun. 12, 2000).

Merkulov, at el., Patterned Growth of Individual and Multiple Vertically Aligned Carbon Nanofibers, vol. 76, No. 24, pp. 3555-3557 (Jun. 12, 2000).

Murakami, et al., "Field Emission from Well-Aligned, Patterned, Carbon Nanotube Emitters", Applied Physics Letters, vol. 76, pp. 1776-1778 (Mar. 27, 2000).

Nakamura, "InGaN-Based Violet Laser Diodes"Semicond Sci. Technol., vol. 14, pp. R27-R40 (1999).

Ottinger, A thermodynamically Admissable Reptation Model for Fast Flows of Entangled Polymers, J. Rheol, vol. 43, No. 6, pp. 1461-1493 (Nov./Dec. 1999).

Poncharal, et al., "Electrostatic Deflections and Electromechanical Resonances of Carbon Nanotubes", Science, vol. 283, pp. 1513-1516 (Mar. 5, 1999).

Ren, et al., "Synthesis of Large Arrays of Well—Aligned Carbon Nanotubes on Glass", Science, vol. 282, pp. 1105-1107 (Nov. 6, 19980.

Ren, et al., "Growth of a Single Freestanding Multiwall Carbon Nanotube on Each Nanonickel Dot", Applied Physics Letters, vol. 75, pp. 1086-1088 (Aug. 23, 1999).

Reulet, et al., "Acoustoelectric Effects in Carbon Nanotubes", Physical Review Letters, vol. 58, No. 13, pp. 2829-2832 (Sep. 25, 2000).

Roukes, "Nanoelectromechanical Systems", Technical Digest of the 2000 solid State Sensor and Actuator Workshop, Hilton Head Island, SC, pp. 1-10 (Jun. 4-8, 2000).

Routkevitch, et al., "Nonlithorahic Nano-Wire Arrays: Fabrication, Physics, and Device Applications", IEEE Transactions on Electron Devices, vol. 43, No. 10, pp. 1646-1658 (Oct. 10, 1996).

Schmalzing, et al., "Toward Real-World Sequencing by Microdevice electrophoresis", Genome Research, vol. 9, pp. 853-858 (1999).

Soper, et al., "Nanoliter-Scale Sample Preparation Methods Directly Coupled to Polymethylmethacrylate-Based Microchips and Gel-Filled Capillaries for the Analyis of Oligonucleotides", Journal of Chromatography A, vol. 853, pp. 107-120 (1999).

Spatz, et al., "Ordered Deposition of Inorganic Clusters From Micellar Block Copolymer films", Langmuir, vol. 16, pp. 407-415 (2000).

Thurn-Albrecht, et al., "Ultrahigh-Density Nanowire Arrays Grown in Self-Assembled Diblock Copolymer Templates", Science, vol. 290, pp. 2126-2129 (Nov./Dec. 1998).

Turner, et al., "Monolithic Nanofluid Sieving Structures, for DNA Manioulation", J. Vac. Sci. Technol. B, vol. 16, No. 6, pp. 3835-3840 (Nov./Dec. 1998).

Van Der Gaag, et al., "Microfabrication Below 10 nm", Applied Physics Letters, vol. 72, No. 13, pp. 2117-2120 (Jan. 29,1990).

Volkmuth, et al., "DNA Electrodiffusion in a 2D Array of Posts", Physical Review Letters, vol. 72, No. 13, pp. 2117-2120 (Mar. 28, 1994).

Westermeier, "Electrophoresis in Practice, a Guide to Method and Applications of DNA and Protein Separations, Chapter 1—Electrophoresis", Second Edition, VCH, A Wiley Company, pp. 5-39 (1997).

Wildoer, et al., "Electronic Structure of Atomically Resolved Carbon Nanotubes", Nature, vol. 391, pp. 59-62 (Jan. 1, 1998).

Xu "Capillary Electrophoresis", Analytical Chemistry, vol. 71, No. 12, pp. 309R-313R (Jun. 15, 1999).

Yang, et al., "Generalized Synthesis of Large-Pore Mesoporous Metal Oxides with Semicrystalline Frameworks", Nature, vol. 396, pp. 152-155 (Nov. 12, 1998).

Yoon, et al., "Comparison of Chain Conformations for Polystyrene and Module Molecules in the Gas Phase, Solvents and Melts from MD Simulations", Abstracts of Papers, Part 2, 215th ACS National Meeting, American Chemical Society, (Mar. 29-Apr. 2, 1998).

Yu, et al., "Tensile Loading of ropes of Single Wall Carbon Nanotubes and their Mechanical Properties", Physical Review Letters, vol. 84, No. 24, pp. 5552-5555 (Jun. 12, 2000).

Zhang, et al., "Elastic Response of Carbon Nanotube Bundles to Visible Light", Physical Review Letters, vol. 82, No. 17, pp. 3472-3475 (Apr. 26,1999).

Zhang, et al., "Electric-Field-Directed Growth of Aligned Single-Walled Carbon Nanotubes", Applied Physics Letters, vol. 79, No. 19 (Nov. 5, 2001).

Zhang, et al., "Formation of Single-Wall Carbon Nanotubes by Laser Ablation of Fullerenes at Low Temperature", Applied Physics Letters, vol. 75, No. 20, pp. 3087-3089 (2004).

* cited by examiner

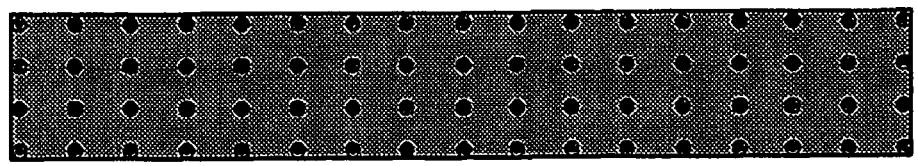
FIG. 3
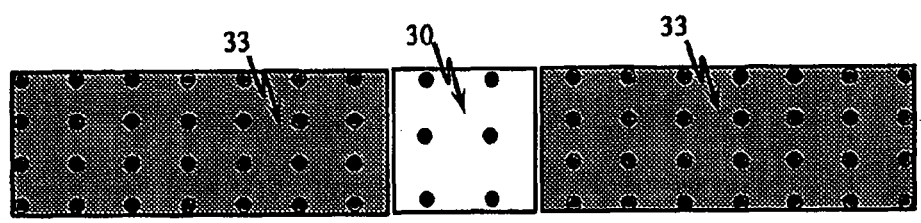
FIG. 4
FIG. 5
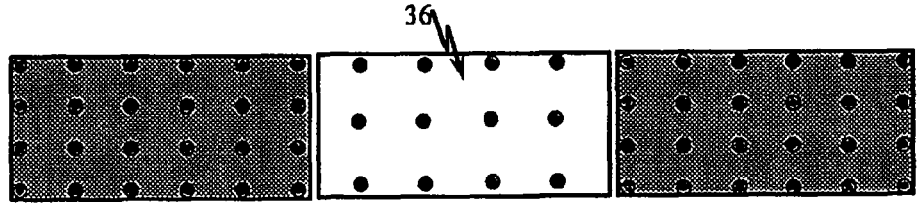
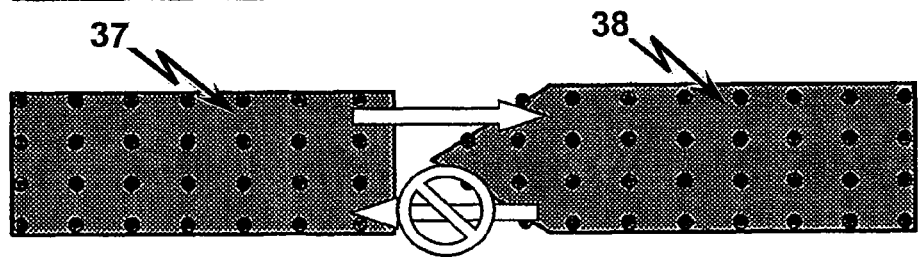
FIG. 6A
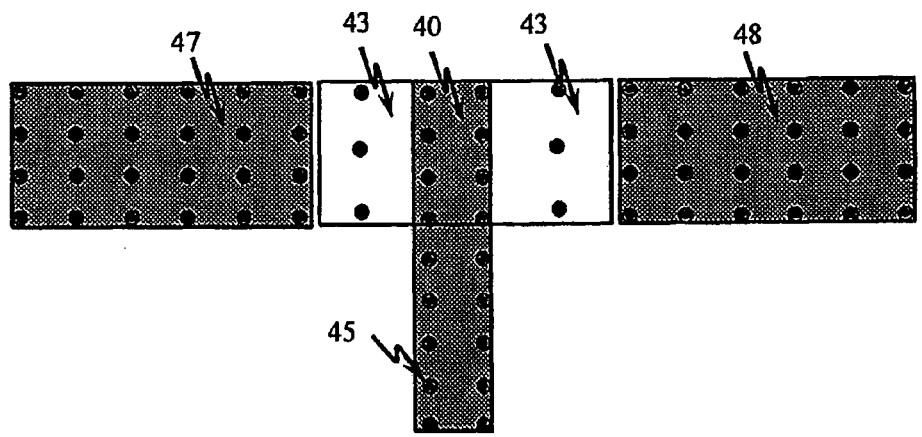
FIG. 7

NANOSCALE WICKING METHODS AND DEVICES

CROSS REFERENCE TO RELATED APPLICATIONS

The present application claims the benefit of provisional application 60/624,113 for "Nanowicks: Nanofiber-Patterned Surface for Passive Fluid Transport, Nanopumping, Ultrafiltration, Nanomixing and Fluidic Logic" filed on Nov. 1, 2004 and incorporated herein by reference in its entirety. The present application is also related to U.S. patent application Ser. No. 11/124,523 filed on May 5, 2005 for "Capillary Lithography of Nanofiber Arrays," the disclosure of which is incorporated herein by reference in its entirety.

GOVERNMENT INTEREST

The invention described herein was made in the performance of work under a NASA contract, and is subject to the provisions of Public Law 96-517 (35 USC 202) in which the Contractor has elected to retain title.

BACKGROUND

1. Field

The present disclosure generally relates to fluid transportation. More particularly, the present disclosure relates to a guided fluid transport method and devices by use of a patterned array of nanofibers or nanotubes. Patterned fibrous mats are formed from aligned carbon nanotube arrays having porous interstices to conduct liquid flow, wherein the porous interstices provide both the driving forces for the flow and functions such as sieving, diverging, and filtration.

2. Related Art

Three thousand years ago, people invented a wick to draw controllable amounts of fuel liquid up through the wick material, against the flow of gravity, to burn at a constant rate at the tip of the wick. In textile research, wicking is the process by which liquids are transported across or along fibers by capillary action (of relevance to perspiration). The applicants recently observed a similar phenomenon with mats of carbon nanotube fibers. Under the aid of a surfactant, the solution not only penetrates into but also flows on the ultra-hydrophobic carbon nanotube mat due to wetting forces and the Marangoni effect. Scientists have been working for about 20 years on fluid wicking circuits, typically called Capillary Pumped Loops (CPL) or Loop Heat Pipes (LHP). Those applications are limited to microscale tubes.

U.S. Pat. No. 6,685,810, also incorporated herein by reference in its entirety, relates to a biomolecular sieve based on carbon nanotube arrays.

U.S. patent application Ser. No. 11/124,523 filed on May 5, 2005 for "Capillary Lithography of Nanofiber Arrays," also incorporated herein by reference in its entirety, discusses the wetting/drying machining-nesting process (capillo-lithography) to postmanipulate patterned CNT arrays in order to produce different surface morphologies. Experiments with carbon nanotube mats have shown that wetting and drying of the mats results in reorientation of the nanotubes into particular formations. Some groups of the carbon nanotubes go from being mostly vertical and aligned with each other to being pulled apart from each other, either radially or linearly, leaving semi-circular or trench-like formations. The shape is like that of a nest, and these structures are referred to as "nests" in the '523 application. These nests have been observed to form upon drying of wetted carbon nanotube mats. According to the present disclosure, these surface morphology changes will be used to control of flow.

SUMMARY

According to a first aspect of the present disclosure, a guided fluid transport method is disclosed, comprising: providing a plurality of nanoscale fibers disposed in a patterned configuration; and transporting fluid along the nanoscale fibers, wherein the nanoscale fibers are disposed in a patterned configuration to allow transport of the fluid in absence of an external power source.

According to a second aspect of the present disclosure, a fluid transport device is disclosed, comprising: a fluid transport element comprising a plurality of nanoscale fibers disposed in a patterned configuration, the fluid transport element allowing self-transport of the fluid between the nanoscale fibers.

According to a third aspect of the present disclosure, a fluid transport device is disclosed, comprising: one or more first fluid transport components, each comprising a plurality of nanoscale fibers disposed in a patterned configuration, said first fluid transport components having a first fluid transport efficiency; one or more second fluid transport components associated with the first fluid transport components, said second fluid transport components having a second fluid transport efficiency different from the first fluid transport efficiency.

Differently from the '810 patent, the present application relates to a fluid transport method with interfacial forces. This problem is one that all nanofluidic researchers have been facing—pumping fluid through nanoscale constrictions. Delivering liquid by wetting and spreading forces avoids unreasonably large pressures required to push liquids through small channels and small interstices because the required pressure gradient increases inverse-proportionally to the fourth power of the characteristic size. In addition, such pressure often requires bulky external auxiliary pumping devices, which go against the design of miniaturization.

It is still another object of the present invention to control flow through adjusting the geometric parameters in nanofibrous arrays. Such parameters may include inter-fiber spacing (packing density), fiber diameters, length of nanofibers (thus the height of the array), potentially varying the length in a gradient fashion, and the width of wicks (also potentially in a gradient way). Preferably, the adjustment of the geometric parameters is done in the fabrication step.

BRIEF DESCRIPTION OF THE DRAWINGS

FIG. 3 shows a homogeneous nanowick conductor.

FIG. 4 shows nanowicks with a small gap therebetween.

FIG. 5 shows nanowicks with a larger gap therebetween.

FIGS. 6A-6C show a nanowick fluidic diode.

FIG. 7 shows a nanowick fluidic transistor.

DETAILED DESCRIPTION

Figure 1:
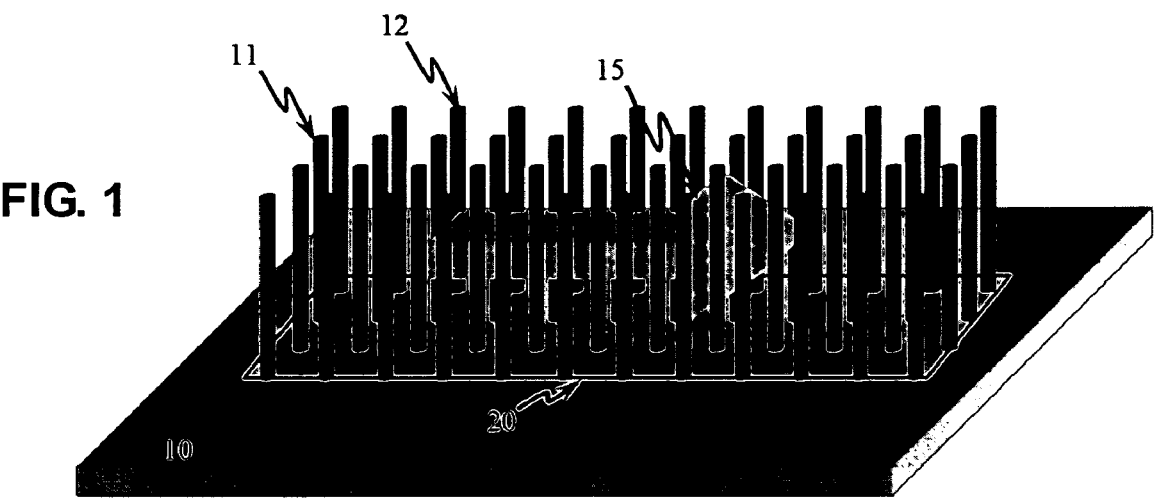
FIG. 1 shows a side view of a nanowick in accordance with the present disclosure.

The embodiments of the present disclosure described below relate particularly to a fluid delivery system based on the spontaneous wetting, wicking, Marangoni forces in small interstices induced by surfactant absorption, evaporation, temperature change or surface tension, and the enabling applications/technologies of such a delivery methods. While the description sets forth various embodiment with specific details, it will be appreciated that the description is illustrative only and should not be construed in any way as limiting the invention. Furthermore, various applications of the invention, and modifications thereto, which may occur to those who are skilled in the art, are also encompassed by the general concepts described below.

A nanowick is a pumpless fluidic device in which fluidic transport is maintained by capillary-like forces through patterned, dense mats of nanoscale fibers with adjustable inter-fiber spacing ranging from nanometers to several tens of nanometers. The nanowick, demonstrated with patterned carbon nanotube arrays, is intended herein to mean all kinds of nanofibrous media that are used to convey liquid for the described potential applications.

The guided fluid transport is carried out and controlled by surface or interfacial tension. Although the surface tension originates from intermolecular forces, it is a macroscopic parameter and can be defined mechanically from the energy or force angle point of view. Surface tension can be viewed as a force per unit length, directed toward the liquid along the local radius of curvature of any curve of interest. Surface tension can also be viewed as energy per unit area, which is required to generate more surface or surface area.

Surface tension forces can include wetting, wicking or Marangoni forces. Wetting refers to how a liquid spreads out on a solid substrate or another liquid. Capillarity studies the interfaces between two immiscible liquids or between a liquid and gas. Wicking was originally defined as the spontaneous flow of liquid in a porous substrate, driven by capillary forces. However, recent experiments and numerical simulations prove that the spontaneous flow by capillary action may happen in open channels, or even just on strips that are chemically different from other areas but geometrically flat without any kind of channel confinement. Sometimes open channel capillary flow is referred to as spreading.

Other than restoring balanced surface tension at the three-phase contact line, another mechanism of droplet spreading is due to the Marangoni effect (1821). It is known that the spatial variation in surface tension at a liquid/gas surface results in added tangential stresses at the surface. This results in a surface traction that acts on the adjoining fluid, giving rise to the fluid motion in the underlying bulk liquid. The tangential force per unit area is given by the surface tension gradient on the free surface, and liquid tends to move in a direction from a low to high surface tension. If the liquid/air surface tension is greater at the front surface of the spreading drop than in the center of the drop, then the difference in surface tension establishes a gradient and will create Marangoni flow. The Marangoni tangent outward stress on the free surface can result from (i) surfactant concentration gradient, (ii) a bi-mixture solution with one component evaporating faster than the other, and (iii) temperature difference.

The control of the surface tension forces is carried out by adjustment of liquid properties (e.g. surface tension, viscosity) and carbon nanotube (CNT) array conformation (height of CNT, diameter of CNT, interspacing between CNT, width of the array, and pore-body-to-pore-throat aspect ratio) in advance, or control of local temperature field in situ. Pore body refers to the large void space in porous media. Pore throat refers to the narrow conduct connecting the pore bodies. The aspect ratio refers to the ratio between the largest linear dimension in pore body and the smallest diameter in the conduct.

Figure 2:
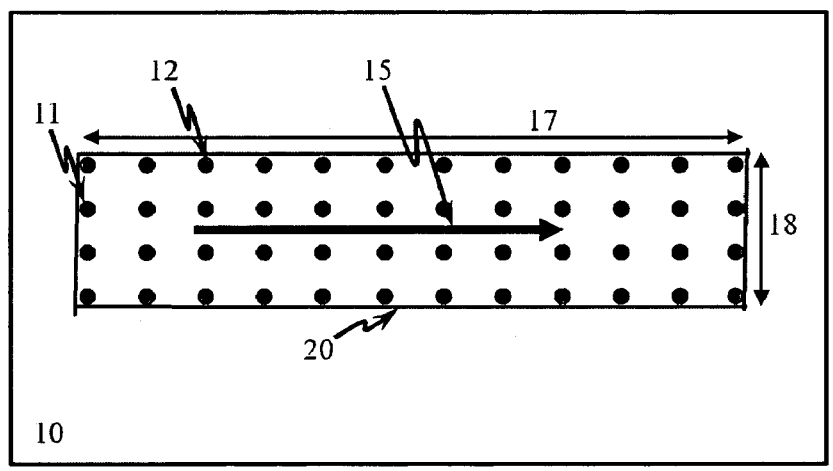
FIG. 2 shows a top view of the nanowick of FIG. 1.

FIGS. 1 and 2 shows a perspective view and a top view, respectively, of a nanowick, which comprises nanofibers (e.g. carbon nanotubes) 11, 12 grown on an area 20 on a supporting wafer substrate 10. The area 20 can be rectangle-shaped. The length 17 of the rectangle 20 is usually much larger than its width 18 for guided flow. Liquid will flow along the length axis 17 as indicated by arrow 15. A detailed example is shown in Example No. 1 below.

In the nanowick of FIGS. 1 and 2 the fibers are grown normal to the substrate 10 in a controlled pattern. The nanofiber interspacing can range, for example, from nanometers to tens of nanometers. The nanofiber length can range from nanometers to several hundreds of microns and even millimeters.

The flow in the nanowick is influenced by the surface pattern of aligned fibers, such as the rectangle 20 in FIGS. 1 and 2.

The patterns can vary not only in their two-dimensional configuration (pattern, geometry, length, width, etc.), but also in the third dimension, normal to the substrate. The height of the fibers can be varied by design across the substrate (by modifying the catalyst deposition) to allow for different phenomena (wicking speed, mixing, etc.). Similarly, the fiber diameter and interspacing can be made to vary across the substrate by proper catalytic deposition prior to fiber growth. Spatial variation in fiber diameter of spacing can allow for logarithmic biomolecular separation, varying wicking speed etc.

A wicking chip can function as a disposable and quick to use "litmus"-like paper (used for testing liquid acidity): drops of fluids can be placed on top of the fiber arrays, and, following drop absorption and transport by wicking action, fluid can be filtered and analyzed (for viscosity, for example) in a very simple manner, without any complicated pumping mechanism.

The flow can also be made continuous, such as in a capillary loop device (CPL). The fluid can be placed at one end of the nanowick, flows through the matrix and evaporates (passively or actively) at the other end, similarly to what happens in a tree. Therefore, the fluid can be kept flowing forever.

Other surface patterns are shown in FIGS. 3-7, allowing a plurality of different fluid logic devices. FIG. 3 shows a homogenous nanowick conductor. FIG. 4 shows a small gap 30 with smaller liquid transport efficiency located between normal nanowicks 33. In this way, structures analog to electrical semiconductors can be formed. The efficiency may be defined as the volume flow rate $$q = \frac{\int_\Gamma v\, dy\, dz}{A}$$

where $v$ is the velocity along the x-axis, $\Gamma$ is the imbibition cross-section in the y-z plane, and $A$ is the cross-sectional surface area.

The smaller efficiency gap may be void or filled with fibers of different lengths, or be an interspacing. FIG. 5 shows an enlarged gap 36 which acts as an insulator between flow circuits.

A small gap allows fluid flows with sufficient momentum—or even just larger volumes of fluid attempting to cross the gap—to jump the gap 30 (FIG. 4). Once the front edge of the liquid touches the downstream edge of the gap 30, the gap functions as a conductor because there is now again a downstream driving due to wicking action.

If the gap 36 (FIG. 5) is large enough (relative to the heights and widths of the arrays, for example), then no liquid quantity being transported in the upstream portion of the nanowick will be able to jump the gap, but instead will just saturate the nanowick and stop moving forward. This is due to the fact that wicking is driven by the interfacial forces present at the downstream edge, so if that force is lost, then the transport mechanism stops). Thus, an insulator function is provided.

A small gap could be, for example, a few interfiber spacings. If an interfiber spacing as 20 nm is taken, then a small gap might be 100-200 nm (or 5-10 spacings) long. In particular, as liquid saturates the upstream region by wicking, there will be a small amount of liquid interface extending out from the region (unless the substrate is very highly hydrophobic or otherwise doesn't like the liquid). Once that liquid interface contacts the downstream edge of the gap, wicking proceeds.

An enlarged gap could be, for example, many interfiber spacings, such as about 20 μm (or 1000 spacings). However, when the substrate is fairly hydrophilic (or when the liquid being used spreads easily on the substrate), the person skilled in the art will understand that the gap may have to be much larger in order to ensure that the liquid interface extending out from the upstream region does not contact the downstream edge of the gap.

Figure 6B:
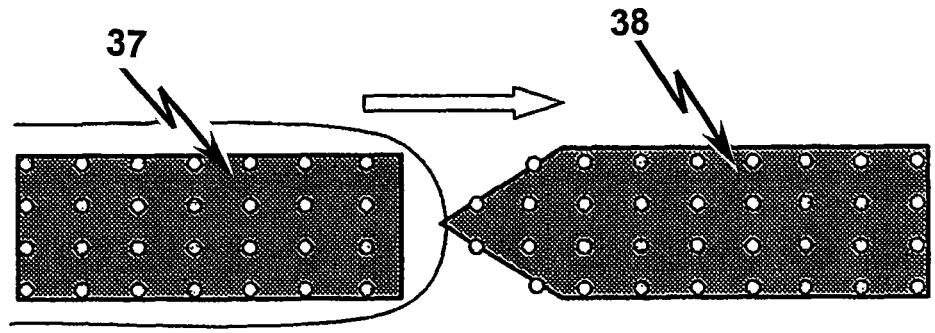
Figure 6C:
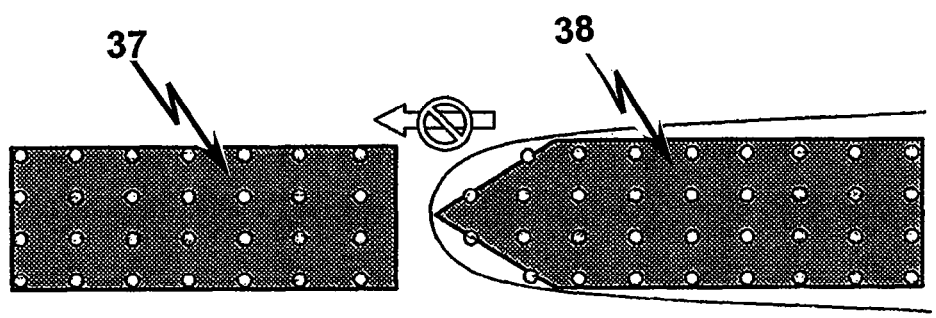

FIGS. 6A-6C show an asymmetric shape of the nanowicks 37, 38 which creates a fluidic diode. The diode design is based on the auxiliary structures around a nanowick. The curves drawn in FIGS. 6B and 6C over the diode illustrate liquid conveyance in case of an asymmetric gap. In particular, by controlling the inlet conditions and the nanowick configuration, liquid will saturate the V-groove between a nanowick sidewall and its supporting substrate. This liquid, standing outside the nanowick, may help the liquid to jump over the asymmetric gap on the diode design, depending on the liquid front shape and outreach.

FIG. 7 shows a combination of regions 40, 45, 47, 48 having a higher transport efficiency, with regions 43 having a lower transport efficiency. This combination allows a transistor-like function to be obtained. In particular, region 45 forms the base of the transistor, region 47 forms the emitter, and region 48 forms the collector, thus allowing addition of fluid to be obtained at the collector 48. Thus an amplifying device is obtained because resistance can be reduced and the input signal can be proportionally amplified.

The nanowick can be designed as a filter, or a chemical reagent carrier because of its very high surface-to-volume ratio. This allows minimization and accurate locating of all kinds of activated carbon functions and applications. In particular, the surface tension effects while removing solvent can be avoided by critical point drying.

With reference to the filter behavior of the nanowick, such concept is similar to that of an activated carbon water filter. Since the adsorption of the filter is surface area-dependent, a high surface-to-volume ratio makes filters function better. Therefore, if contaminant-containing liquid is transported through a nanowick, then the contaminants can be left behind, adsorbed onto the large amount of available carbon surface. The liquid coming out the end of the nanowick will have less contaminant concentration, thus being filtered. Increased or decreased levels of filtration can be obtained by surface functionalization of the nanofibers making up the nanowicks. By performing appropriate chemical steps on the nanofibers, known as such to the person skilled in the art, adsorption of the contaminant present in the transport liquid can be obtained.

The 'chemical reagent carrier' concept is similar, in that the nanowick can be pre-coated with a desired chemical reagent—for example by a previous filtration-like step, or by surface functionalization—and then when the transported liquid flows through the nanowick, the reagents on the fluid interact with the reagents on the nanowick, mediated by the surface-to-volume ratio of the patterned configuration.

By way of example and not of limitation, the nanoscale fibers can be 20 microns long and be spaced 20 nm apart. The person skilled in the art will understand that also different values are possible.

Figure 8:
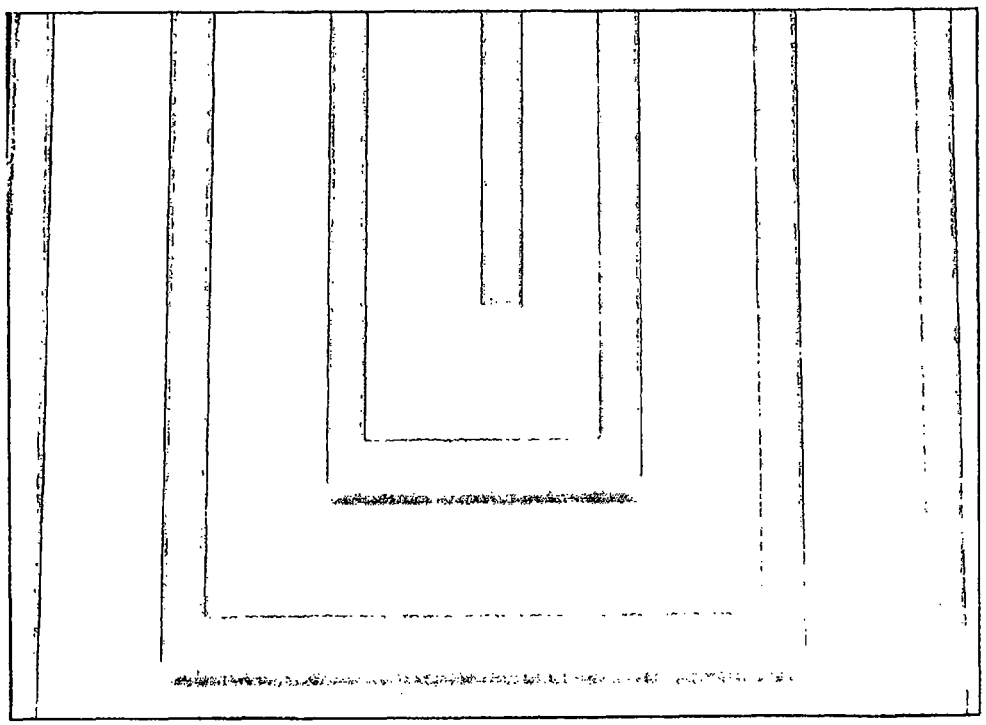
FIG. 8 shows a nanowick rectangular spiral.

FIG. 8 shows a nanowick rectangular spiral embodiment, which can be used as part of an integrated nanowick device, for example to increase the length of liquid that must be transported while minimizing substrate area required. This embodiment can be used for applications such as filtration or mixing, where transport distance (and therefore nanowick surface area) is important.

Figure 9A:
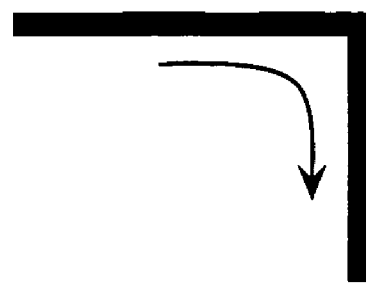
FIGS. 9A and 9B show nanowick turning and branching flow.
Figure 9B:
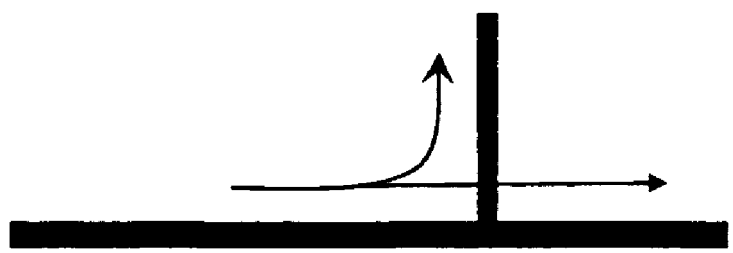

FIGS. 9A and 9B show how nanowick turns and branches can be used to direct fluid transport in various pre-determined directions by the way the nanowick itself is patterned. FIG. 9A shows an L-patterned nanowick, and FIG. 9B shows a T-patterned nanowick.

It should be noted that liquid may accumulate in corners when a nanowick is turning in the wafer surface plane (x-y). In such cases, flow may convey away through V-shaped grooves formed between a nanowick sidewall and the supporting wafer. If x is the long axis for the nanowick and flow, the groove is located along the x-axis and has a V-shaped cross section in the y-z plane.

Figure 10:
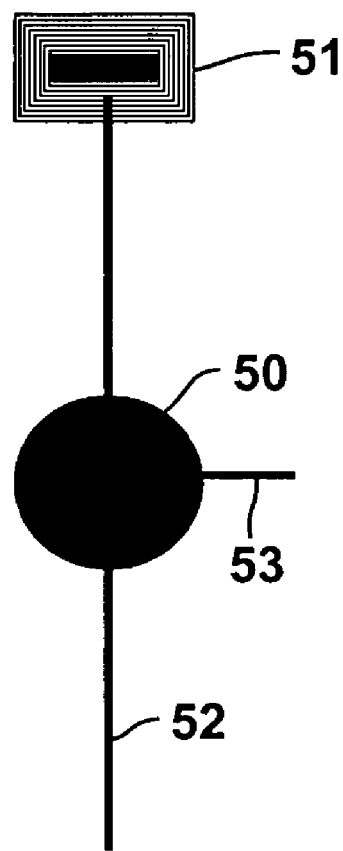
FIG. 10 shows a nanowick mixer with storage reservoir.

FIG. 10 shows an embodiment comprising a mixer 50 with a liquid storage reservoir 51. One type of liquid is supplied from the storage reservoir 51, and another type of liquid is supplied through one of the lines 52, 53. Mixing occurs in the circular intersection region 50, also made of nanowick material and then flows into the remaining line 52 or 53 into the rest of the overall circuit.

Figure 11:
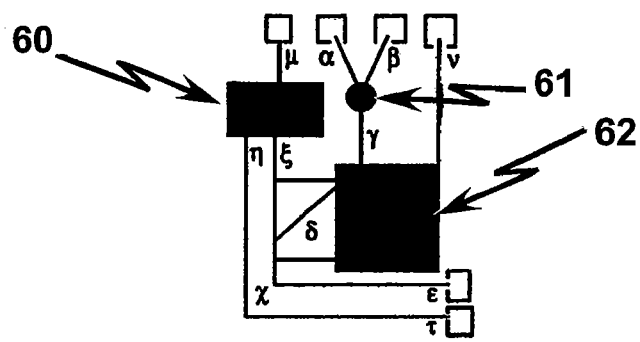
FIG. 11 shows a nanowick integrated system.

FIG. 11 shows a nanowick integrated system. Several transport lines, indicated by greek letters, are shown, as well as larger nanowick regions 60, 61, 62. The larger nanowick regions can be used as delay devices or as mixing regions. The fluid transport across the delay devices will be slower than along a small cross-section nanowick line. The delay devices and mixing regions can contain multiple inputs and outputs from the transport lines.

Figure 12:
FIG. 12 is a photograph showing a hydrophobic liquid flow guide within a nanowick.

FIG. 12 is a photography showing a cross-shaped region created by nest formation upon the evaporation of pre-treatment with liquid. This technique is useful for wicking because once the nanofibers form the pattern shown, they are fixed in this configuration, thus effectively creating a new kind of pattern. The cross-shaped region of FIG. 12 will be more susceptible to wetting by a hydrophobic liquid (less nanowick material will be presented to the liquid), and so this liquid will follow the pattern shown as a guide for its movement.

Figure 13:
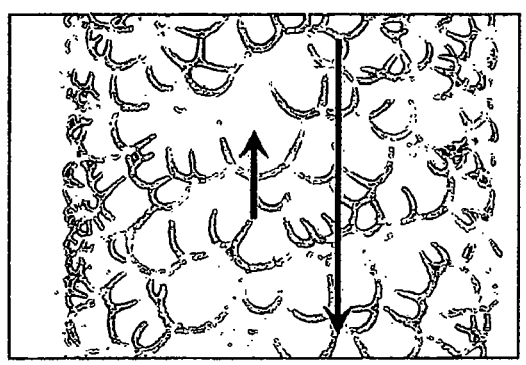
FIG. 13 is a photograph showing a nanowick with bias flow.

FIG. 13 is a photograph showing how properly created nest patterns, in this case oriented along a nanowick's long axis, can be used to bias nanowick transport. Once this pattern is created in the nanowick, it is robust to further wetting and wicking processes. When liquid transport occurs through the nanowick, the directionality of the pattern seen in FIG. 13 causes biased transport along the long axis of the nanowick, and helps to prevent backflow.

Figure 14:
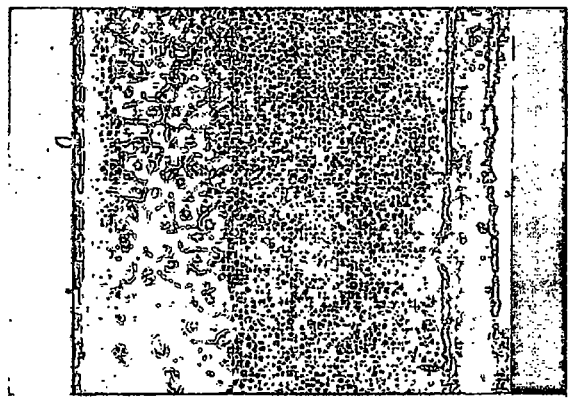
FIG. 14 is a photograph showing a nanowick with shear flow.

FIG. 14 is a photograph showing how a properly created nest pattern (using gravity effects) can be used to induce a shear flow within the transported liquid in the nanowick. The larger pattern features in one section of the nanowick will provide a different rate of transport compared to the smaller featured region, and thus the mismatch in rates of transport will result in shear flow for stoichiometric mixing applications, filtration, and reagent chemistry.

Figure 15A:
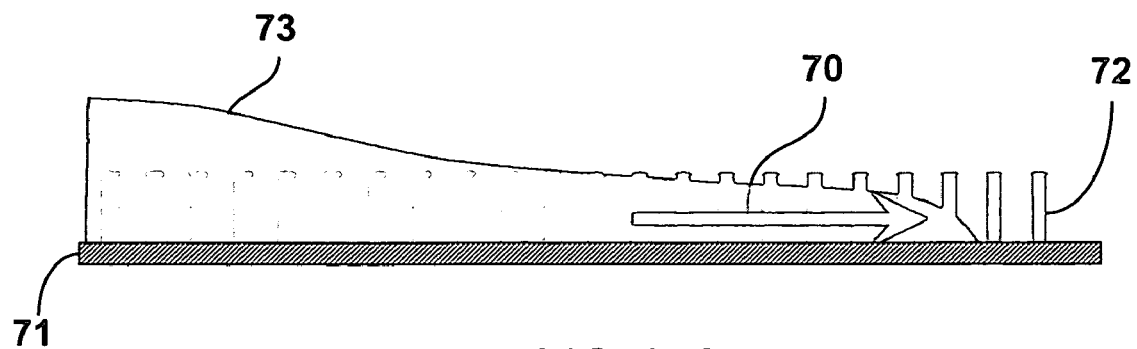
FIGS. 15A and 15B show an advancing smooth bottom liquid front that leads the upper front in a nanowick.
Figure 15B:
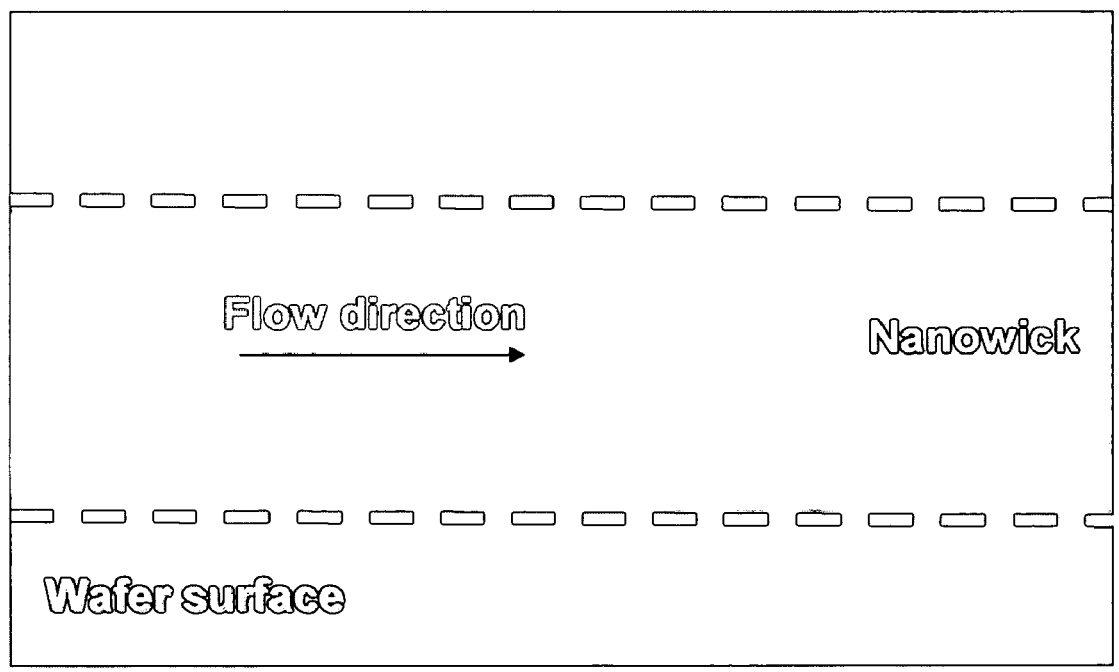

FIGS. 15A (cross-sectional view) and 15B (bottom view) show one way that a liquid front can proceed within a nanowick. In this case, the front 70 is in contact with the substrate 71, and moving through the interstices of the nanofibers 72. Further behind the liquid front (region 73), there is liquid transport occurring on top of the nanowick. This upper liquid transport is essentially moving forward onto more of its own liquid as a substrate, rather than the actual nanowick substrate. Microscope experiments have shown this to be one mode of liquid transport in nanowicks. FIG. 15B shows the fluorescein signal present in the liquid used in the experiment, and shows how the front adjacent to the substrate looks as it proceeds along within an actual nanowick.

Figure 16A:
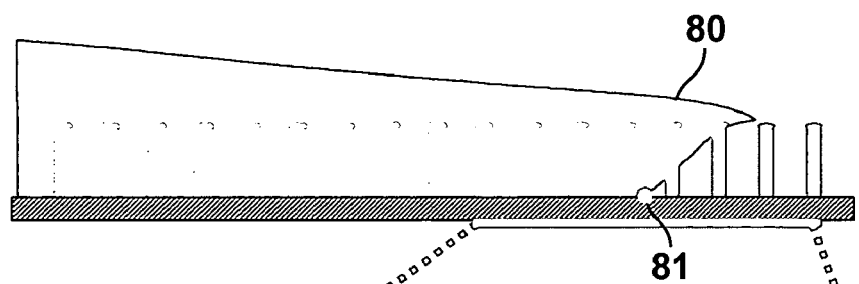
FIGS. 16A and 16B show an advancing smooth bottom liquid front that lags the upper front in a nanowick.
Figure 16B:
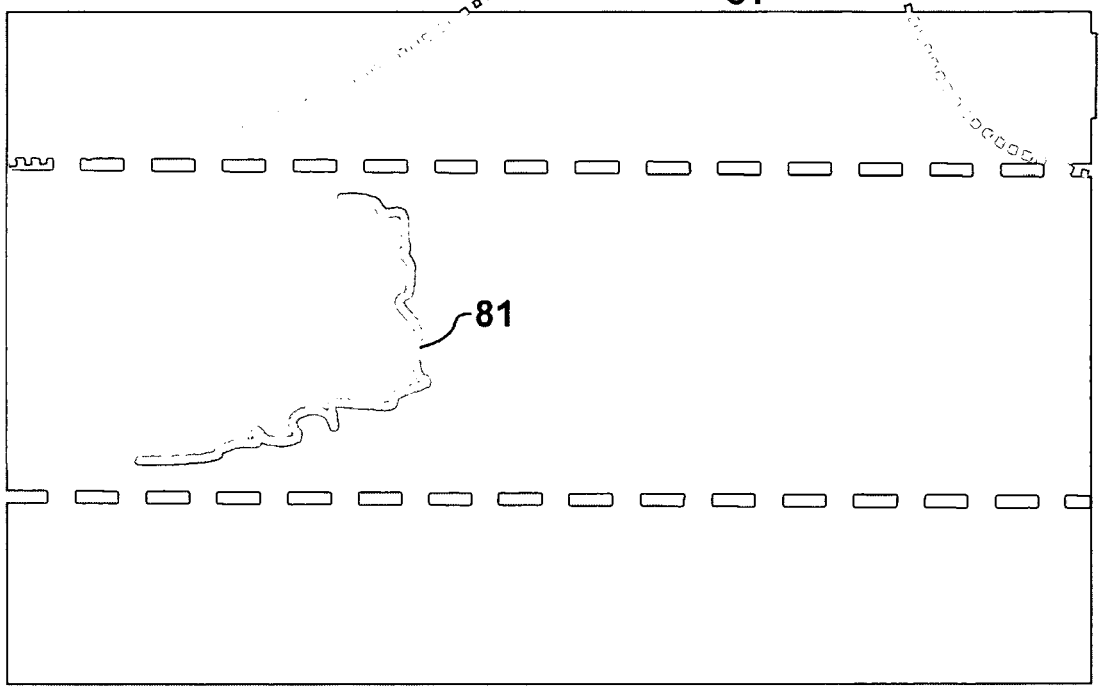

FIGS. 16A (cross-sectional view) and 16B (bottom view) show another shape 80 of liquid front proceeding in a nanowick. Such kind of flow is still smooth because all visibly wet regions are in contact with each other, i.e. there are no discreet wet regions. The upper liquid front 80 is spreading out on top of the nanowick, and the lower liquid front is coming along behind it in slower way. The jagged edge 81 is due to the discreet locations of the nanofibers within the nanowick. Fluorescein imaging can be used to identify the lower liquid front.

The nanowick can be designed to control mixing because external flow through a nanofiber array is diffusive, which assures effective mixing at micrometer and millimeter scales.

Because surface forces are predominant in the nanowick, any mechanism that influences surface dynamics can be included to modify the nanowicking properties.

Examples are electrical field, temperature field, liquid properties, and the geometric conformation of nanowick itself. Nanowick geometric parameters include height (e.g., 0.5 micron to 1 mm) and diameter (e.g., 5 nm to 100 nm) of the carbon nanotubes in the nanowick, interspacing (e.g., 10 nm to 300 nm) between the carbon nanotubes, the array lattice structure, the width of the nanowick (the area where nanotubes stand, e.g., 1 micron and more), surface curvature of the nanowick, and topology of the nanotube tip surface (roughness, free surface/encapsulated nanowick).

A nanowick can be open or capped (encapsulated). Open nanowicks allow easy optical access, analysis and fluid injection, while encapsulated nanowicks can be used for conventional channel flow and simple control of evaporation and pressure. By covering the nanowick, for example with a PDMS layer directly in contact with the top of the nanowick or with a gap between the PDMS ceiling and the nanowick top, the evaporation can either be entirely eliminated, or the gas environment present in the gap (e.g., humidity of it) can be controlled such that a desired evaporation rate is obtained. With encapsulation with a gap, the pressure of the gap can also be controlled, potentially adding extra control to how the wicking process itself occurs.

A nanowick can allow fluid transport to spaces that are prohibitive to the introduction of tubing as for lubrication purposes.

Flow through nanowick can be transient for disposable (body-worn) and quick-to-use microfluidic analysis chips. In other words, the supply of liquid available to be transported by a nanowick can be intermittently present. By way of example, some sample may be available (e.g., body worn nanowick attached to a blood sample), transported through a nanowick and some analysis be applied until the sample supply is spent (or totally spread over the nanowick such that there is no longer wicking occurring). Then another sample is supplied to the nanowick (and presumably some drying or other means of creation of a wicking interface downstream occurs), and the transient process can be repeated. If the transient process only occurs once, it can be referred to as "one time use" application.

Flow through nanowick can also be continuous, similar to melting wax flow in a candle wick. Continuous flow can be achieved by continuously removing liquid from the outlet of the nanowick, and continuously providing liquid to the inlet of the nanowick. Thus the differences between continuous application and transient application of a nanowick have to do with the liquid supply/removal conditions. If desired, the nanowick itself can be exactly the same in both cases.

The nanowick pattern can have different scales. For example, a heterogeneous nanowick may possess both micrometer-sized and nanometer-sized interstices. The micrometer-sized interstices can assure a fast response. At the same time, the nanometer-sized interstices can ensure high sensitivity and carrier density. With the term 'interstices' reference is made not only to interspace between nanofibers but also to the space between boosting or auxiliary structures around the nanowicks.

While several illustrative embodiments of the invention have been shown and described in the above description, numerous variations and alternative embodiments will occur to those skilled in the art. Such variations and alternative embodiments are contemplated, and can be made without departing from the scope of the invention as defined in the appended claims.

What is claimed is:

1. A guided fluid transport method comprising:
   providing a plurality of nanoscale fibers disposed in a patterned configuration; and
   transporting fluid along the nanoscale fibers, wherein the nanoscale fibers are disposed in a patterned configuration adapted to allow transport of the fluid in absence of an external power.

2. The method of claim 1, comprising:
   providing said plurality of nanoscale fibers disposed in said patterned configuration on a base; and
   transporting said fluid across the base and among the nanoscale fibers.

3. The method of claim 1, wherein said plurality of nanoscale fibers comprises carbon nanotube (CNT) arrays.

4. The method of claim 3, wherein the CNT arrays are homogenous.

5. The method of claim 3, wherein the CNT arrays are heterogeneous.

6. The method of claim 1, wherein the nanoscale fibers are open nanoscale fibers.

7. The method of claim 1, wherein the nanoscale fibers are encapsulated nanoscale fibers.

8. The method according to claim 1, wherein said guided fluid transport is carried out and controlled by surface tension forces.

9. The method of claim 8, wherein said surface tension forces comprise wetting, wicking and Marangoni forces.

10. The method of claim 8, wherein said surface tension forces are controlled by adjustment of liquid properties.

11. The method of claim 10, wherein said liquid properties include surface tension, viscosity and parameters of the patterned configuration of the nanoscale fibers.

12. The method of claim 1, wherein the fluid contains contaminant and transportation of the fluid separates the contaminant from the fluid.

13. The method of claim 1, wherein the fluid contains a first chemical reagent and the nanoscale fibers contain a second chemical reagent, and wherein a reaction between the first chemical reagent and second chemical reagent occurs during transportation of the fluid.

14. The method of claim 1, wherein the nanoscale fibers are multiscaled.

15. The method of claim 1, wherein the nanoscale fibers form a heterogeneous nanowick.

16. The method of claim 15, wherein the heterogeneous nanowick comprises micrometer-size interstices and nanometer-sized interstices.

17. The method of claim 1, wherein the patterned configuration comprises delay regions and mixing regions.

18. A guided fluid transport method comprising:
providing a plurality of nanoscale fibers disposed in a patterned configuration; and
transporting fluid along the nanosale fibers, wherein the nanoscale fibers are disposed in a patterned configuration adapted to allow transport of the fluid in the absence of an external power source and wherein the patterned configuration is a rectangular spiral.

19. A guided fluid transport method comprising:
providing a plurality of nanoscale fibers disposed in a patterned configuration; and
transporting fluid along the nanoscale fibers, wherein the nanoscale fibers are disposed in a patterned configuration adapted to allow transport of the fluid in absence of an external power source and wherein the patterned configuration comprises at least one L-patterned nanowick.

20. A guided fluid transport method comprising:
providing a plurality of nanoscale fibers disposed in a pattern configuration;
transporting fluid along the nanoscale fibers, wherein the nanoscale fibers are disposed in a patterned configuration adapted to allow transport of fluid in absence of an external power source and wherein the patterned configuration comprises at least one T-patterned nanowick.

21. The method of claim 20, wherein the patterned configuration includes delay regions and mixing regions.

22. The method of claim 20, wherein the patterned configuration includes mixing regions adapted to allow a mixing of liquids.

23. A fluid transport device comprising:
two first fluid transport components, each comprising a plurality of nanoscale fibers disposed in a patterned configuration including delay regions and mixing regions, said fluid transport components having a first fluid transport efficiency; and
one or more second fluid transport components associated with the first fluid transport components, said second fluid transport components having a second fluid transport efficiency different from the first fluid efficiency;
wherein the first fluid transport component is rectangular shaped, the second first fluid transport component is arrow shaped, and a separation between the first fluid component and the second first fluid component forms a second fluid transport component.

24. The device of claim 23, comprising:
a fluid transport element comprising a plurality of nanoscale fibers disposed in a patterned configuration on a base, the fluid transport element adapted to allow self-transport of the fluid among the nanoscale fibers and along the base, wherein the patterned configuration includes mixing regions adapted to allow mixing of liquids.

25. The device of claim 24, wherein said self-transport occurs in absence of external power source.

26. The device of claim 24, wherein the base is a flexible substrate.

27. The device of claim 23, further comprising a liquid storage reservoir.

28. The device of claim 23, wherein two first fluid transport components are separated by one second fluid transport component.

29. The device of claim 28, wherein the second fluid transport component has a length comparable to the length of the two first fluid transport components.

30. The device of claim 28, wherein the second fluid transport component has a length inferior to the lengths of the two first fluid transport component.

31. The device of claim 23, comprising three first fluid transport components and two second fluid transport components, a first second fluid transport component being located between a first fluid transport component and a second first fluid transport component, a second fluid transport component being located between the second first fluid transport component and a third first fluid transport component.

32. The device of claim 31, further comprising a fourth first fluid transport component, connected with the second first fluid transport component.

33. The device of claim 23, wherein the fluid transport device acts as a fluidic semiconductor.

34. The device of claim 23, wherein at least one of the one or more second fluid transport components acts as an insulator.

35. The device of claim 23, wherein a plurality of nanoscale fibers is disposed in a patterned configuration, the patterned configuration being a rectangular spiral.

36. The device of claim 23, wherein a plurality of nanoscale fiber is disposed in a patterned configuration including at least one L-patterned nanowick.

37. The device of claim 23, wherein a plurality of nanoscale fiber is disposed in a patterned configuration including at least one T-patterned nanowick.

* * * * *